US008016718B2

(12) United States Patent
Ohshima et al.

(10) Patent No.: US 8,016,718 B2
(45) Date of Patent: Sep. 13, 2011

(54) VEHICLE DRIVE UNIT

(75) Inventors: Atsuya Ohshima, Okazaki (JP); Shigeo Tsuzuki, Takahama (JP); Mitsugi Yamashita, Anjo (JP); Haruki Shirasaka, Chiryu (JP)

(73) Assignee: Aisin AW Co., Ltd., Aichi-ken (JP)

( * ) Notice: Subject to any disclaimer, the term of this patent is extended or adjusted under 35 U.S.C. 154(b) by 519 days.

(21) Appl. No.: 12/273,309

(22) Filed: Nov. 18, 2008

(65) Prior Publication Data
US 2009/0143193 A1 Jun. 4, 2009

(30) Foreign Application Priority Data

Nov. 30, 2007 (JP) .................................. 2007-310765

(51) Int. Cl.
*F16H 15/38* (2006.01)
(52) U.S. Cl. ............................ 477/50; 477/146; 475/116
(58) Field of Classification Search .................... 477/50, 477/52, 58, 86, 67, 66, 146, 156, 158, 145, 477/127, 143, 128, 126; 475/116, 119, 121, 475/125, 129, 5; 474/11, 28, 8, 12; 123/488, 123/78 F; 180/65.25, 65.27, 65.28
See application file for complete search history.

(56) References Cited

U.S. PATENT DOCUMENTS

| | | | | |
|---|---|---|---|---|
| 4,974,696 A * | 12/1990 | Miyajima et al. | ............... | 475/86 |
| 5,052,980 A * | 10/1991 | Itoh et al. | ........................ | 474/11 |
| 5,695,423 A * | 12/1997 | Hirose | .......................... | 475/129 |
| 5,709,140 A * | 1/1998 | Hirose | .......................... | 477/126 |
| 5,725,451 A * | 3/1998 | Tsukamoto et al. | .......... | 475/128 |
| 5,993,349 A * | 11/1999 | Sugihara | .......................... | 476/8 |
| 6,093,974 A * | 7/2000 | Tabata et al. | ............... | 180/65.25 |
| 6,302,822 B1 * | 10/2001 | Suzuki et al. | .................. | 477/143 |
| 6,475,113 B2 * | 11/2002 | Suzuki et al. | .................. | 477/127 |
| 7,128,676 B2 * | 10/2006 | Kinugasa et al. | .................. | 475/5 |
| 7,234,424 B2 * | 6/2007 | Tanaka et al. | ............... | 123/48 B |
| 2007/0243074 A1 | 10/2007 | Murakami et al. | | |

FOREIGN PATENT DOCUMENTS

| | | |
|---|---|---|
| FR | 2 784 434 A1 | 4/2000 |
| JP | 05-35777 B2 | 5/1993 |
| JP | 08-014076 A | 1/1996 |
| JP | 2000-213389 A | 8/2000 |
| JP | 2000-313252 A | 11/2000 |
| JP | 2004-116652 A | 4/2004 |
| JP | 2005-226802 A | 8/2005 |
| JP | 2005-351414 A | 12/2005 |

* cited by examiner

*Primary Examiner* — Hau Phan
(74) *Attorney, Agent, or Firm* — Sughrue Mion, PLLC

(57) ABSTRACT

A vehicle drive unit is provided which includes a hydraulic circuit capable of efficiently supplying a hydraulic pressure from an accumulator to a hydraulic servo while minimizing the capacity of the accumulator. In a hydraulic circuit included in a continuously variable transmission, an accumulator is connected through an electromagnetic switch valve to an oil passage connecting a clutch pressure control valve and a manual valve, a one-way valve for allowing oil to flow only in the direction from the clutch pressure control valve toward the accumulator and the forward clutch is provided in the oil passage. The electromagnetic switch valve switches an oil passage to a communicating state when the oil pump is driven and switches the oil passage to a shut-off state when the oil pump is stopped.

22 Claims, 6 Drawing Sheets

VEHICLE DRIVE UNIT

INCORPORATION BY REFERENCE

The disclosure of Japanese Patent Application No. 2007-310765 filed Nov. 30, 2007 including the specification, drawings and abstract is incorporated herein by reference in its entirety.

BACKGROUND OF THE INVENTION

1. Field of the Invention

The present invention relates to a vehicle drive unit that quickly supplies a hydraulic pressure to a hydraulic servo upon restarting of an engine to enable, for example, rapid engagement of a friction engagement element that enables starting of a vehicle.

2. Description of the Related Art

In known art, a vehicle having a function to automatically stop an engine when predetermined conditions are satisfied during running of the vehicle (an idling stop function) has been put to practical use in order to achieve fuel saving, reduction in exhaust gas emission, noise reduction, and the like. In such a vehicle, the engine is stopped when all of conditions such as zero vehicle speed, accelerator OFF, and brake ON are satisfied.

When the engine is stopped, an oil pump generally connected to the engine is also stopped. Therefore, for example, oil that is supplied to a forward clutch (hydraulic servo) to be engaged during forward running is discharged through an oil passage, and the forward clutch is disengaged.

When predetermined restart conditions are satisfied such as when a driver depresses an accelerator pedal, the stopped engine is restarted and the oil pump is also restarted. At this time, the forward clutch needs to be engaged as soon as the engine is restarted. Engagement shock will occur if the forward clutch is engaged at a high engine speed.

Various technologies for preventing such engagement shock have been proposed. For example, in one of the technologies, an accumulator capable of accumulating a hydraulic pressure is provided in a branched manner in an oil passage that connects a forward clutch of an automatic transmission and an oil pump for generating a hydraulic pressure to supply the hydraulic pressure to the forward clutch (Japanese Patent Application Publication No. JP-A-2000-313252). When the engine is restarted, the hydraulic pressure accumulated in the accumulator is supplied to the forward clutch. Thus, generation of engagement shock is prevented, and engine restart capability is improved.

In another technology, an accumulator is provided in a branched manner in a hydraulic circuit of an automatic transmission, and a check valve is provided on the oil pump side of the accumulator (Japanese Patent Application Publication No. JP-A-H8-14076, and Japanese Patent Application Publication No. JP-A-2005-226802). With this structure, a hydraulic pressure is constantly supplied from the accumulator to a forward clutch while the engine is stopped. The forward clutch in the automatic transmission is thus constantly maintained in an engaged state.

In the technology described in Japanese Patent Application Publication No. JP-A-2000-313252, however, the hydraulic pressure accumulated in the accumulator cannot be efficiently supplied to the forward clutch (hydraulic servo) in a short time when the engine is restarted. The reason why this problem occurs is as follows: when the hydraulic pressure accumulated in the accumulator is supplied to the forward clutch (hydraulic servo), the hydraulic pressure is supplied not only to the forward clutch (hydraulic servo) but also to a primary regulator valve and leaks through the primary regulator valve.

Moreover, a second accumulator, a second switch valve, and a branched oil passage are provided before the forward clutch (hydraulic servo). These elements increase a fluid resistance and an oil passage length when the hydraulic pressure accumulated in the accumulator is supplied to the forward clutch (hydraulic servo). This increases the time it takes until the hydraulic pressure is supplied from the accumulator to the forward clutch (hydraulic servo). This is one of the reasons why the hydraulic pressure accumulated in the accumulator cannot be efficiently supplied to the forward clutch (hydraulic servo) in a short time.

In the technology described in Japanese Patent Application Publication No. JP-A-H8-14076, and Japanese Patent Application Publication No. JP-A-2005-226802, on the other hand, the hydraulic pressure is constantly supplied from the accumulator to the forward clutch while the engine is stopped, whereby the forward clutch in the automatic transmission is constantly maintained in an engaged state. In this case, engagement shock can be eliminated because hydraulic pressure supply is not delayed. In this technology, however, the accumulator needs to have an increased capacity. Moreover, an outlet (turbine) side of a torque converter is stopped when the engine is started. Therefore, rotation of the engine needs to be absorbed by oil of the torque converter. The engine is thus restarted while stirring the oil of the torque converter. This imposes a large burden on the starter system, causing additional problems such as need for a larger starter.

SUMMARY OF THE INVENTION

The present invention is made to address the above problems, and it is an aspect of the present invention to provide a vehicle drive unit including a hydraulic circuit capable of efficiently supplying a hydraulic pressure from an accumulator to a hydraulic servo in a short time while minimizing the capacity of the accumulator.

A vehicle drive unit according to the present invention includes a hydraulic circuit that includes an oil pump for generating a hydraulic pressure, a hydraulic servo that is controlled by a hydraulic pressure, a hydraulic control valve for controlling the hydraulic pressure generated by the oil pump to a predetermined pressure to operate the hydraulic servo, a manual valve for switching an oil passage according to a shift position operation of a driver, an accumulator for accumulating the hydraulic pressure generated by the oil pump, and a switch valve for switching an oil passage connecting the accumulator and the hydraulic servo between a shut-off state and a communicating state. The oil pump is stopped and driven as required in a state where the manual valve is set to a running position, and the hydraulic circuit supplies the hydraulic pressure accumulated in the accumulator to the hydraulic servo when driving of the oil pump is started. The accumulator is connected through the switch valve to an oil passage connecting the hydraulic control valve and the hydraulic servo, a first one-way valve for allowing oil to flow only in a direction from the hydraulic control valve toward the accumulator and the hydraulic servo is provided in the oil passage connecting the hydraulic control valve and the hydraulic servo, and the switch valve is switched to a communicating state when the oil pump is driven, and to a shut-off state when the oil pump is stopped.

Note that, examples of the oil pump include an electric oil pump that is not connected to the engine, as well as a mechanical oil pump connected to the engine.

In this vehicle drive unit, when the oil pump is driven, the hydraulic control valve controls the hydraulic pressure generated by the oil pump to a predetermined pressure in order to operate the hydraulic servo, and the hydraulic pressure thus controlled is supplied to the hydraulic servo. At this time, since the switch valve is in a communicating state, the hydraulic pressure generated by the oil pump is accumulated in the accumulator. When the oil pump is stopped, the switch valve switches to a shut-off state and the hydraulic pressure accumulated in the accumulator is retained. When the oil pump is driven again in this state, the switch valve switches to a communicating state and the hydraulic pressure accumulated in the accumulator is supplied to the hydraulic servo. At this time, the hydraulic pressure from the accumulator is supplied to the hydraulic servo and toward the hydraulic control valve. However, the oil flow toward the hydraulic control valve is blocked by the first one-way valve. In other words, the hydraulic pressure from the accumulator can be reliably prevented from leaking from the hydraulic control valve. Since the hydraulic pressure from the accumulator is thus supplied only to the hydraulic servo, the hydraulic pressure can be efficiently supplied from the accumulator to the hydraulic servo in a short time.

In this vehicle drive unit, the hydraulic pressure is not continually supplied from the accumulator to a forward clutch (hydraulic servo) while the oil pump is stopped. Therefore, it is not necessary to increase the capacity of the accumulator, and additional problems such as need for a larger starter do not occur. In other words, the accumulator need only have a capacity large enough to be able to operate the hydraulic servo until the hydraulic pressure generated by the oil pump is supplied to the hydraulic servo after the oil pump is started.

According to the vehicle drive unit, the hydraulic pressure can be efficiently supplied from the accumulator to the hydraulic servo in a short time while minimizing the capacity of the accumulator.

In the vehicle drive unit of the present invention, it is desirable that the manual valve is provided in an oil passage connecting the first one-way valve and the hydraulic servo.

In the vehicle drive unit of the present invention, the manual valve drains the hydraulic pressure that is applied from the manual valve to the hydraulic servo, when the manual valve is set to a shift position in which the hydraulic pressure is not required for the hydraulic servo.

In a state where the manual valve thus provided is set to a non-running position such as the P range and the N range, the hydraulic pressure can be reliably drained from the manual valve when the hydraulic pressure is not required for the hydraulic servo. Therefore, even though the first one-way valve for allowing oil to flow only in the direction from the oil pump toward the hydraulic servo is provided in the oil passage connecting the oil pump and the hydraulic servo, the hydraulic pressure can be reliably drained from the hydraulic servo when the hydraulic pressure is not required for the hydraulic servo. Since the state in which the hydraulic pressure is applied to the hydraulic servo is not maintained more than necessary, reliability and durability of the hydraulic servo are not degraded.

In the vehicle drive unit of the present invention, it is desirable that the manual valve and the hydraulic servo are directly connected by an unbranched oil passage.

With this structure, when driving of the oil pump is started and the hydraulic pressure is supplied from the accumulator to the hydraulic servo, the resistance applied to the oil flowing to the hydraulic servo can be reduced as much as possible, and the oil passage length can be reduced. As a result, the hydraulic pressure can be very efficiently supplied from the accumulator to the hydraulic servo in a shorter time.

Alternatively, in the vehicle drive unit of the present invention, the accumulator is connected through the switch valve to an oil passage connecting the manual valve and the hydraulic servo.

This structure enables the accumulator and the hydraulic servo to be disposed close to each other. Therefore, the oil passage length from the accumulator to the hydraulic servo can further be reduced. As a result, the hydraulic pressure can be very efficiently supplied from the accumulator to the hydraulic servo in a shorter time.

In the vehicle drive unit of the present invention, an oil passage in which a throttle valve is provided and an oil passage in which a second one-way valve for allowing oil to flow only in a direction from the accumulator toward the hydraulic servo are provided in parallel in an oil passage that connects the oil passage connecting the hydraulic control valve and the hydraulic servo and the accumulator.

With this structure, when the oil pump is stopped and the hydraulic pressure accumulated in the accumulator is used, the hydraulic pressure can be supplied quickly (at a high speed) from the accumulator to the hydraulic servo through the oil passage having the second one-way valve provided therein.

On the other hand, while the oil pump is being driven, the hydraulic pressure generated by the oil pump is supplied to the accumulator through the oil passage having the throttle valve provided therein. The hydraulic pressure is thus accumulated slowly (at a low speed) in the accumulator. Accordingly, when driving of the oil pump is started, the hydraulic pressure generated by the oil pump is not used so much for accumulation in the accumulator in the state where the hydraulic pressure accumulated in the accumulator is reduced immediately after being supplied to the hydraulic servo. Therefore, when driving of the oil pump is started, the hydraulic pressure generated by the oil pump can be quickly (at a high speed) supplied to the hydraulic servo. Thus, the capacity required for the accumulator can further be reduced.

In the vehicle drive unit of the present invention, it is desirable that the vehicle drive unit is a continuously variable transmission including a primary pulley and a secondary pulley, the hydraulic servo is one of a forward friction engagement element and a reverse friction engagement element, the hydraulic control valve is a clutch pressure control valve, and a third one-way valve for allowing oil to flow only in a direction from the line pressure regulator valve toward the pulley is provided in an oil passage that connects an oil passage, which connects the clutch pressure control valve and a line pressure regulator valve for regulating the hydraulic pressure generated by the oil pump to a line pressure to be supplied to the pulley, and the pulley.

By thus applying the present invention to a continuously variable transmission, the third one-way valve can prevent oil leakage toward the hydraulic control valve in the pulley that has a relatively small oil leakage amount when the oil pump is stopped. As a result, reduction in hydraulic pressure in the pulley can be prevented. When driving of the oil pump is started, the hydraulic pressure accumulated in the accumulator can be quickly supplied to the frictional engagement element that has a large oil leakage amount while the oil pump is stopped. The hydraulic pressure can thus be appropriately supplied to the frictional engagement element and the pulley when driving of the oil pump is started. As a result, generation of engagement shock of the frictional engagement element and slippage of a belt on the pulley can be reliably prevented.

The third one-way valve is provided in an oil passage connecting the line pressure regulator valve and the secondary pulley.

When driving of the oil pump is started, almost no hydraulic pressure is required to be applied to the primary pulley, while the hydraulic pressure needs to be applied to the secondary pulley. By providing the one-way valve on the secondary pulley side, oil leakage from the secondary pulley is suppressed, whereby slippage of the belt can be reliably prevented.

As described above, the vehicle drive unit according to the present invention is capable of efficiently supplying a hydraulic pressure from an accumulator to a hydraulic servo in a short time while minimizing the capacity of the accumulator.

BRIEF DESCRIPTION OF THE DRAWINGS

The invention will now be described in greater detail with reference to FIG. 1 to 6, in which.

DETAILED DESCRIPTION OF EXEMPLARY EMBODIMENTS OF THE INVENTION

Hereinafter, exemplary embodiments of a vehicle drive unit of the present invention will be described in detail with reference to the accompanying drawings.

First Non-Limiting Embodiment

Figure 1:
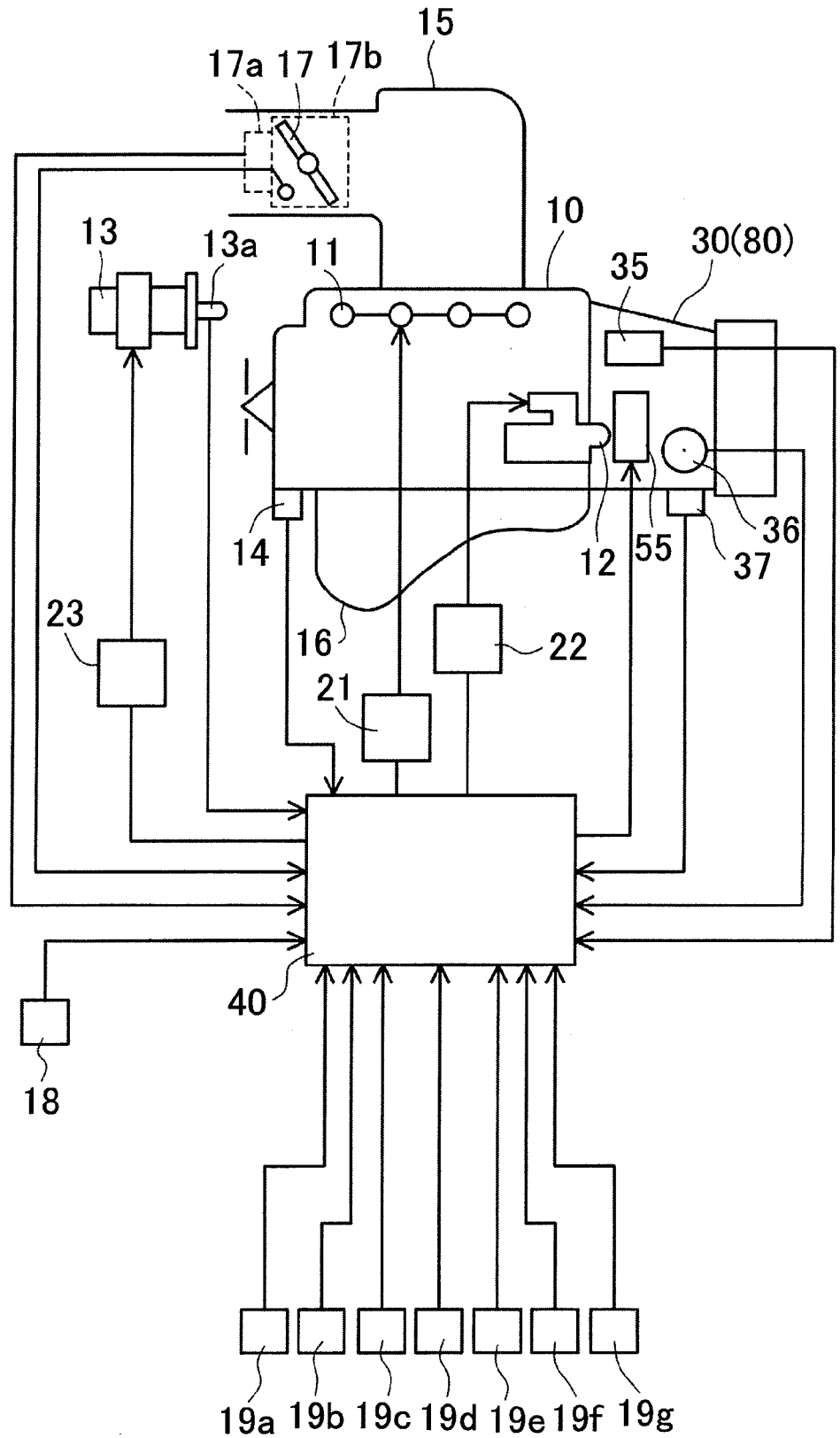
FIG. 1 is a structural diagram schematically showing a structure of a vehicle drive system according to a first non-limiting embodiment.

First, a first non-limiting embodiment will be described. In the first embodiment, the present invention is applied to a vehicle drive system having a continuously variable transmission (CVT). The vehicle drive system of the first embodiment will now be described with reference to FIG. 1. FIG. 1 is a structural diagram schematically showing a structure of the vehicle drive system according to the first embodiment.

As shown in FIG. 1, the drive system of the first embodiment includes an engine 10, a continuously variable transmission 30, a control unit 40 that provides overall control over the system, and various sensors for detecting, for example, the states of the engine 10, the continuously variable transmission 30 and a vehicle.

An injector 11, a starter 12, and an igniter 13 are provided in the engine 10. The continuously variable transmission 30 is connected to an output shaft of the engine 10.

An intake manifold 15 and an exhaust manifold 16 are connected to each cylinder of the engine 10. A throttle valve 17 that operates in response to operation of an accelerator pedal is provided in the intake manifold 15. A throttle position sensor 17a for detecting an opening of the throttle valve 17 and an idle switch 17b for detecting a fully closed state of the throttle valve 17 are provided for the throttle valve 17. The injector 11, the starter 12, and the igniter 13 are connected to the control unit 40 through a fuel relay 21, a starter relay 22, and an ignition relay 23, respectively.

The continuously variable transmission 30 is a known belt-type continuously variable transmission. The continuously variable transmission 30 has an input shaft for receiving an output of the engine 10 through a torque converter, a forward/reverse switching clutch (which are not shown), or the like. A primary pulley 31 (shown in FIG. 2) described below is mounted on the input shaft. The primary pulley 31 is formed by a fixed sheave and a movable sheave that are coaxially and integrally rotatably mounted on the input shaft. While the fixed sheave is fixed to the input shaft, the movable sheave is displaceable in an axial direction of the input shaft. Opposing surfaces of the fixed sheave and the movable sheave are conic surfaces, and a V belt that is wound around the primary pulley 31 is interposed between the opposing sheave surfaces.

The continuously variable transmission 30 includes an output shaft provided in parallel with the input shaft. A secondary pulley 32 (shown in FIG. 2) described below is mounted on the output shaft. The secondary pulley 32 has the same structure as that of the primary pulley 31, and the V belt that is wound around the secondary pulley 32 is interposed between opposing sheave surfaces.

In the continuously variable transmission 30, the V belt is wound around the primary pulley 31 and the secondary pulley 32 so that power is transmitted from the input shaft to the output shaft through the V belt. In each pulley, the position of the movable sheave with respect to the fixed sheave is maintained or changed by the hydraulic pressure that is controlled by a hydraulic circuit 50 (shown in FIG. 2) described below, whereby a winding radius of the V belt on the primary pulley 31 and a winding radius of the V belt on the secondary pulley 32 are maintained or changed. A rotation speed ratio between the input shaft and the output shaft, that is, a speed reduction ratio, is thus maintained or changed.

A shift position switch 35 for detecting a shift position (range) that is set by operation of a driver and a vehicle speed sensor 36 for detecting a vehicle speed based on a rotation speed of the output shaft of the continuously variable transmission 30 connected to a propeller shaft are provided in the continuously variable transmission 30. An oil temperature sensor 37 for detecting an oil temperature in the transmission is also provided in the continuously variable transmission 30.

The control unit 40 includes a CPU that controls various equipments, a ROM having various numerical values and programs written therein, a RAM in which numerical values and flags are written to a predetermined region during arithmetic operation. Note that programs for an engine stop process and an engine restart process described below are written in advance in the ROM of the control circuit 40.

An ignition primary coil 13a of the igniter 13, a crank position sensor 14, the throttle position sensor 17a, the idle switch 17b, an ignition switch 18, the shift position switch 35, the vehicle speed sensor 36, the CVT oil temperature sensor 37, a G sensor 19a, a water temperature sensor 19b, a battery voltage sensor 19c, a brake pedal switch 19d, a brake master cylinder pressure sensor 19e, an intake air temperature sensor 19f, an intake air amount sensor 19g, and the like are connected to the control unit 40. An electromagnetic switch valve 55 provided in the continuously variable transmission 30 as described below is also connected to the control unit 40. The control unit 40 executes various arithmetic operations based on signals from various switches and sensors, and outputs ignition-cut and ignition signals, fuel-cut and fuel injection signals, a starter drive signal, a drive signal of the electromagnetic switch valve 55, and the like.

Figure 2:
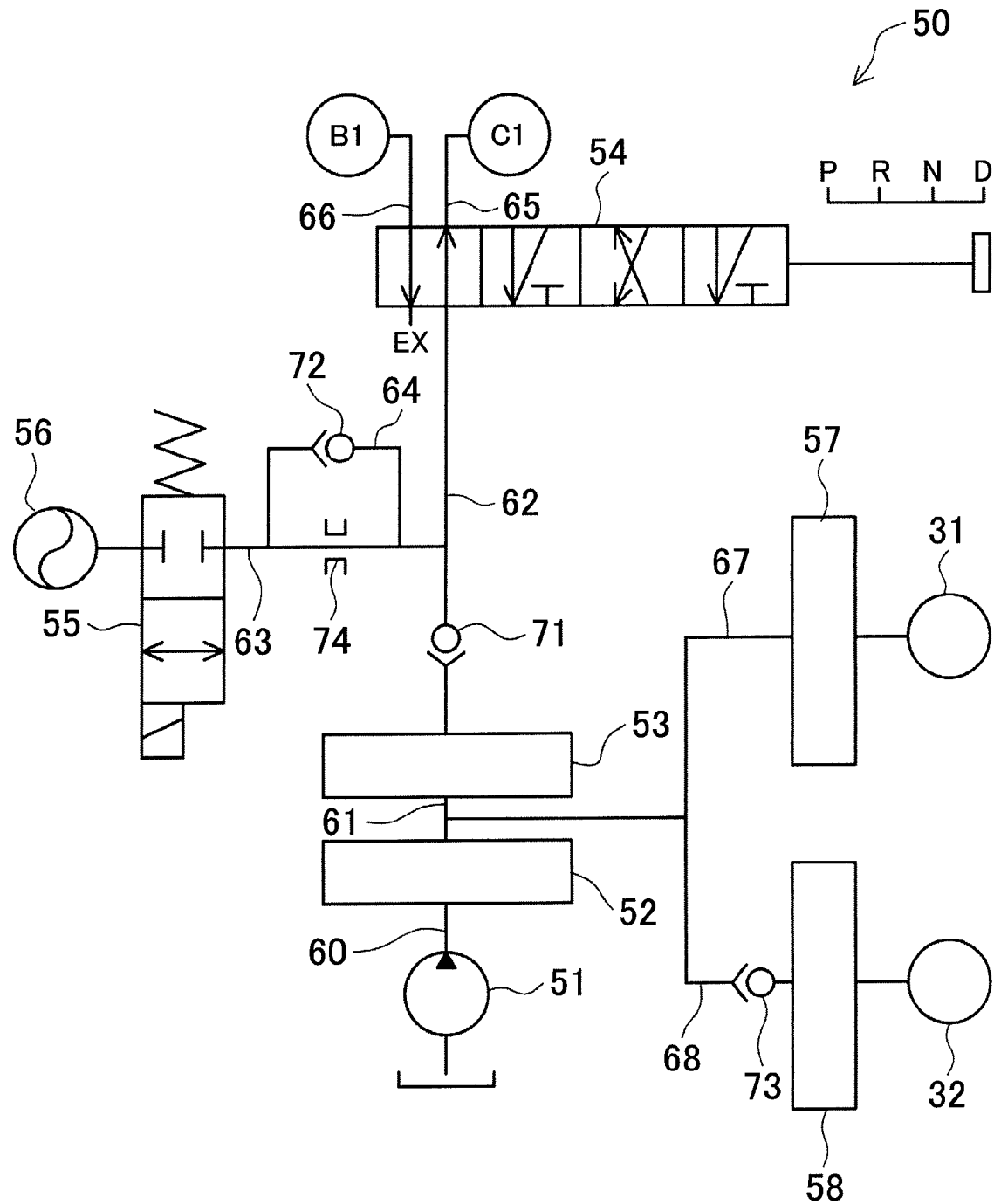
FIG. 2 is a diagram showing a hydraulic circuit included in a continuously variable transmission.

The hydraulic circuit 50 provided in the continuously variable transmission 30 will now be described with reference to FIG. 2. FIG. 2 is a diagram showing a hydraulic circuit provided in the continuously variable transmission. As shown in FIG. 2, the hydraulic circuit 50 includes an oil pump 51, a line pressure regulator valve 52, a clutch pressure control valve 53, a manual valve 54, an electromagnetic switch valve 55, an accumulator 56, a shift control valve 57, and a secondary sheave pressure control valve 58. Such a hydraulic circuit 50 is connected to a forward clutch C1 (forward friction engagement element), a reverse brake B1 (reverse friction engagement element), a primary pulley 31, and a secondary pulley 32.

The oil pump 51 serves as an overall hydraulic pressure source of the continuously variable transmission 30 and generates a hydraulic pressure by the driving force of the engine 10. The line pressure regulator valve 52 controls the hydraulic pressure generated by the oil pump 51 to a predetermined pressure in order to control the respective pulley positions of the primary pulley 31 and the secondary pulley 32. The clutch pressure control valve 53 controls the hydraulic pressure generated by the oil pump 51 to a predetermined pressure in order to operate the forward clutch C1 and the reverse brake B1 (where the forward clutch C1 and the reverse brake B1 collectively form a hydraulic servo). The manual valve 54 switches an oil passage in response to a shift position operation of the driver. The accumulator 56 temporarily accumulates the hydraulic pressure generated by the oil pump 51 and regulated by the clutch pressure control valve 53.

In this hydraulic circuit 50, the oil pump 51 and the line pressure regulator valve 52 are connected to each other by an oil passage 60. The line pressure regulator valve 52 and the clutch pressure control valve 53 are connected to each other by an oil passage 61. The oil passage 61 branches into oil passages 67, 68, and the primary pulley 31 and the secondary pulley 32 are connected to the oil passages 67, 68, respectively. More specifically, the oil passage 67 is connected to the primary pulley 31 through the shift control valve 57, and the oil passage 68 is connected to the secondary pulley 32 through a one-way valve 73 and the secondary sheave pressure control valve 58.

The clutch pressure control valve 53 and the manual valve 54 are connected to each other by an oil passage 62. The manual valve 54 and the forward clutch C1 are connected to each other by an oil passage 65, and the manual valve 54 and the reverse brake B1 are connected to each other by an oil passage 66. Therefore, when the manual valve 54 is set to a D position (range), the oil passages 62 and 65 communicate with each other and the oil passage 66 is connected to a drain EX. When the manual valve 54 is set to R position, the oil passages 62 and 66 communicate with each other and the oil passage 65 is connected to the drain EX. Further, when the manual valve 54 is set to N or P position, the oil passage 62 is shut off from the oil passages 65 and 66, and the oil passages 65 and 66 are connected to the drain EX. In other words, the hydraulic pressure that is applied to the forward clutch C1 is released from the drain EX when the manual valve 54 is set to a position where the hydraulic pressure is not required for the forward clutch C1 (a position other than D position). The hydraulic pressure that is applied to the reverse clutch B1 is released from the drain EX when the manual valve 54 is set to a position where the hydraulic pressure is not required for the reverse clutch B1 (a position other than R position), The oil passages 65, 66 are both an unbranched oil passage (having no branched portion). The forward clutch C1 and the reverse clutch B1 are directly connected to the manual valve 54 by the oil passages 65, 66, respectively.

An oil passage 63 having its one end connected to the accumulator 56 is connected to the oil passage 62. A one-way valve 71 for allowing oil to flow only in the direction from the clutch pressure control valve 53 toward the manual valve 54 is provided in the oil passage 62 between the connection point with the oil passage 63 and the clutch pressure control valve 53.

The electromagnetic switch valve 55 is provided in the oil passage 63. This electromagnetic switch valve 55 is opened and closed by the control circuit 40. The electromagnetic switch valve 55 is opened when the oil pump 51 is driven, and is closed when the oil pump 51 is stopped. In other words, the oil passage 63 is brought into a communicating state and a shut-off state by opening and closing the electromagnetic switch valve 55. The oil passage 63 has an orifice 74 between the connection point with the oil passage 62 and the electromagnetic switch valve 55. A branched oil passage 64 is provided so as to bypass the orifice 74. A one-way valve 72 for allowing oil to flow only in the direction from the accumulator 56 toward the oil passage 62 is provided in the branched oil passage 64. Therefore, oil flows through the oil passage 63 when a hydraulic pressure is accumulated in the accumulator 56. Oil flows through the branched oil passage 64 when the hydraulic pressure accumulated in the accumulator 56 is supplied from the accumulator 56.

Hereinafter, functions of the vehicle drive system having the above structure will be described. In the vehicle drive system of this embodiment, the oil pump 51 is driven by the driving force of the engine 10 during running of the vehicle, and a hydraulic pressure is supplied to the hydraulic circuit 50. In the continuously variable transmission 30, the position of the movable sheave with respect to the fixed sheave is maintained or changed in the primary pulley 31 and the secondary pulley 32 by the hydraulic pressure controlled by the shift control valve 57 and the secondary sheave pressure control valve 58, respectively. A winding radius of the V belt on the primary pulley 31 and a winding radius of the V belt on the secondary pulley 32 are thus maintained or changed, whereby a speed reduction ratio is maintained or changed (shifted). At this time, the hydraulic pressure generated by the oil pump 51 is supplied to the accumulator 56 through the oil passages 60, 61, 62, and 63, in addition to the continuously variable transmission 30.

Figure 3:
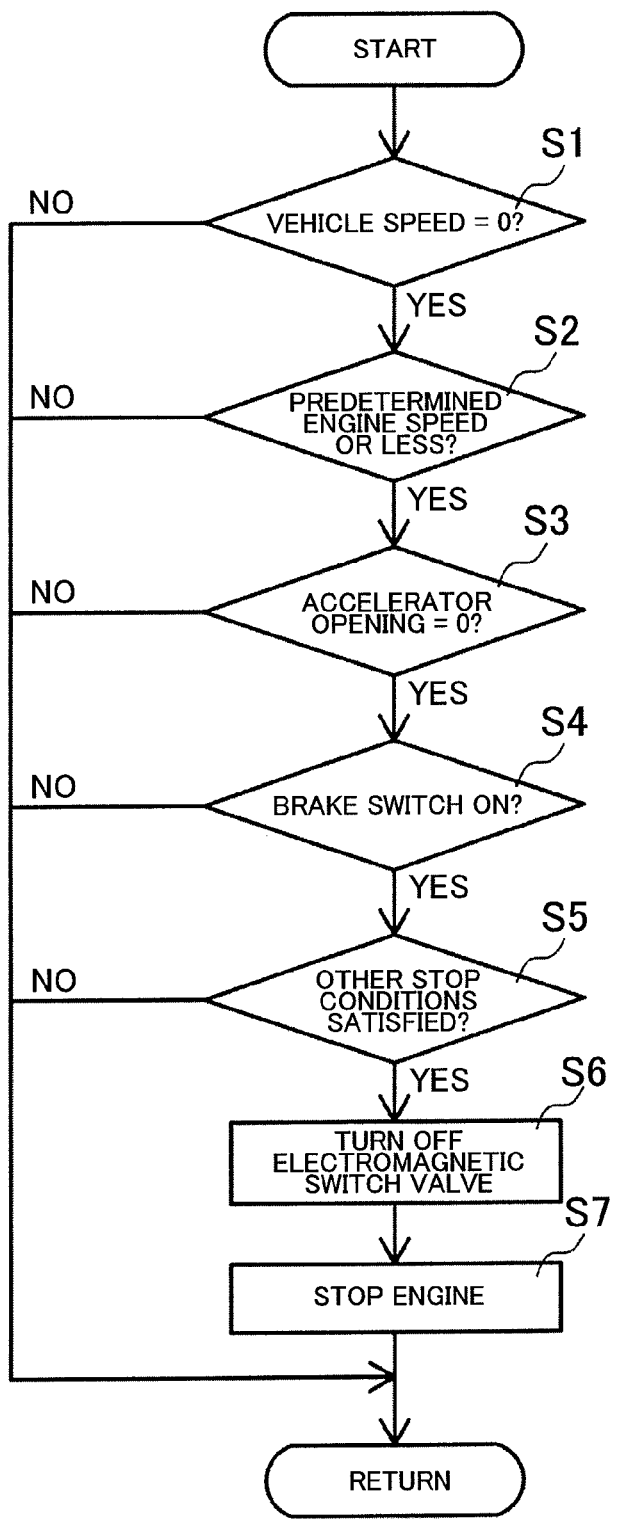
FIG. 3 is a flowchart illustrating the contents of an engine stop process that is executed by a control unit.

In the vehicle drive system of this embodiment, the engine 10 is temporarily stopped by the control unit 40 when predetermined conditions are satisfied. This engine stop process will now be described with reference to FIG. 3. FIG. 3 is a flowchart illustrating the contents of the engine stop process that is executed by the control unit.

First, the control unit 40 determines whether the vehicle speed is zero or not (S1). More specifically, the CPU of the control unit 40 determines whether the vehicle speed is zero or not based on a vehicle speed signal from the vehicle speed sensor 36. If the control unit 40 determines that the vehicle speed is zero (S1: YES), the control unit 40 then determines whether or not the engine speed is a predetermined speed or less (S2). More specifically, the CPU of the control unit 40 determines whether or not the engine speed is a predetermined speed or less based on an engine speed signal applied from the crank position sensor 14 to the control unit 40. For example, the predetermined engine speed used in S2 may be set to a value that is slightly higher than an idle speed. On the other hand, if the control unit 40 determines that the vehicle speed is not zero (S1: NO), the processing routine is terminated without stopping the engine 10.

If the control unit 40 determines that the engine speed is the predetermined value or less in the processing of S2 (S2: YES), the control unit 40 then determines whether the accelerator opening is zero or not (S3). On the other hand, if the control unit 40 determines that the engine speed is not the predetermined value or less (S2: NO), this processing routine is terminated without stopping the engine 10.

More specifically, in S3, the CPU of the control unit 40 determines whether the accelerator opening is zero or not based on an accelerator opening signal from the throttle position sensor 17*a*. Note that an output signal of the idle switch 17*b* may be additionally considered when determining whether the accelerator opening is zero or not. If the control unit 40 determines that the accelerator opening is zero in the processing of S3 (S3: YES), the control unit 40 then determines whether the brake switch is ON or not (S4). On the other hand, if the control unit 40 determines that the accelerator opening is not zero (S3: NO), the processing routine is terminated without stopping the engine 10.

More specifically, in S4, the CPU of the control unit 40 determines whether the brake pedal switch is ON or not based on an output signal of the brake pedal switch 19*d*. Note that, for more accurate determination of whether the brake pedal switch is ON or not, that is, whether a braking device of the vehicle is operating or not, a detection signal of the brake master cylinder pressure sensor 19*e* may be additionally considered. In this case, for example, the brake switch can be determined to be ON only when the brake pedal switch is ON and the pressure detected by the brake master cylinder pressure sensor 19*e* has a predetermined value or more.

If the control unit 40 determines that the brake switch is ON in the processing of S4 (S4: YES), the control unit 40 then determines whether other engine stop conditions are satisfied or not (S5). On the other hand, if the control unit 40 determines that the brake switch is not ON (S4: NO), the processing routine is terminated without stopping the engine 10.

For example, other engine stop conditions in the processing of S5 include determination of upward slope/inclination based on an output signal of the G sensor 19*a* (the condition is satisfied when an inclination angle has a prescribed value or less), determination of an engine water temperature based on an output signal from the water temperature sensor 19*b* (the condition is satisfied when the water temperature is in a predetermined range), determination of a battery voltage based on an output signal of the battery voltage sensor 19*c* (the condition is satisfied when the battery voltage has a predetermined value or more), determination of a CVT oil temperature based on an output signal of the hydraulic temperature sensor 37 (the condition is satisfied when the CVT oil temperature is within a predetermined range), the time elapsed from the previous starting of the engine (the condition is satisfied when the time has a predetermined value or more), and vehicle speed history (the condition is satisfied when the vehicle speed has a predetermined value or more).

If all of the other engine stop conditions are satisfied in the processing of S5, that is, if it is determined to be YES in all the processing in S1 to S5 (S5: YES), the electromagnetic switch valve 55 is turned OFF (S6), and the engine 10 is then stopped (S7). More specifically, the control unit 40 outputs a fuel-cut signal and an ignition-cut signal that form an engine stop signal to the fuel relay 21 and the ignition relay 23, respectively. As a result, a high voltage is prevented from being supplied from the igniter 13 to an ignition plug and fuel is prevented from being injected from the injector 11, and the engine 10 is stopped. On the other hand, if none of the other engine stop conditions is satisfied (S5: NO), the processing routine is terminated without stopping the engine 10.

Figure 4:
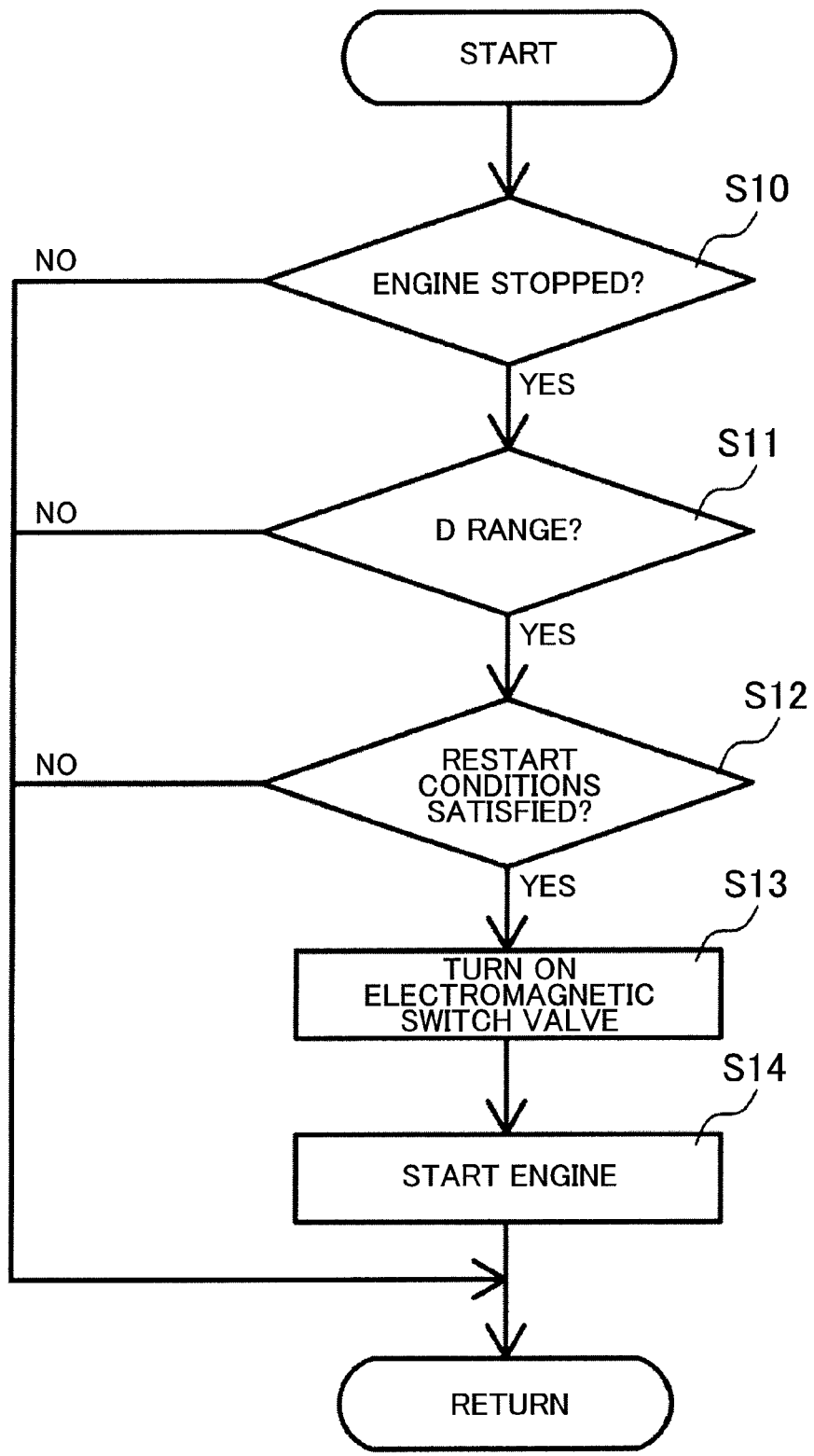
FIG. 4 is a flowchart illustrating an engine restart process that is executed by the control unit.

When the engine 10 is stopped, the oil pump 51 is also stopped. Therefore, a hydraulic pressure is not supplied to the hydraulic circuit 50. However, since the electromagnetic switch valve 55 is turned OFF and the oil passage 63 is shut off, the hydraulic pressure is accumulated in the accumulator 56. When the engine 10 is temporarily stopped as described above, the control unit 40 executes a processing routine of restarting the engine 10. Hereinafter, the processing of restarting the engine after temporarily stopping the engine will be described with reference to FIG. 4. FIG. 4 is a flowchart illustrating the contents of an engine restart process that is executed by the control unit.

First, the control unit 40 determines whether the engine 10 has been stopped or not (S10). If the control unit 40 determines that the engine 10 has been stopped (S10: YES), the control unit 40 then determines whether the position of the manual valve 54 is in the D range or not (S11). This determination is made based on an output signal from the shift position switch 35. Note that if the control unit 40 determines that the engine 10 has not been stopped (S10: NO), the engine 10 need not be restarted. Therefore, the processing routine is terminated.

If the control unit 40 determines that the position of the manual valve 54 is in the D range in the processing of S11 (S11: YES), the control unit 40 then determines whether engine restart conditions are satisfied or not (S12). On the other hand, if the control unit 40 determines that the position of the manual valve 54 is not in the D range (S11: NO), the processing routine is terminated. For example, the engine restart conditions in the processing of S11 include that the vehicle speed is zero, the brake switch is OFF, the accelerator opening is not zero, and the like.

If it is determined in the processing of S12 that the engine restart conditions are satisfied (S12: YES), the electromagnetic switch valve 55 is turned ON (S13) and the engine 10 is restarted (S14). More specifically, the control unit 40 outputs a fuel injection signal, an ignition signal, and a starter drive signal which form an engine restart signal to the fuel relay 21, the ignition relay 23, and the starter relay 22, respectively. As a result, the starter 12 is driven, a high voltage is supplied from the igniter 13 to the ignition plug, and fuel is injected from the injector 11, whereby the engine 10 is restarted. On the other hand, if the engine restart conditions are not satisfied (S12: NO), the processing routine is terminated.

As described above, in the case where the engine 10 is restarted, the electromagnetic switch valve 55 is turned ON right before the engine is started. Therefore, the oil passage 63 is brought into a communicating state. The accumulator 56 and the oil passage 62 thus communicate with each other. As a result, a hydraulic pressure accumulated in the accumulator 56 is supplied through the oil passages 63, 64 to the oil passage 62. Note that, since the oil passage 63 has the orifice 74, the hydraulic pressure from the accumulator 56 is supplied through the oil passage 64 (bypassing the orifice 74) to the oil passage 62.

The hydraulic pressure thus supplied to the oil passage 62 is supplied from the oil passage 65 to the forward clutch C1 through the manual valve 54. Since the one-way valve 71 is provided between the connection point between the oil passages 62 and 63 and the clutch pressure control valve 53, the hydraulic pressure supplied to the oil passage 62 is not released from the clutch pressure control valve 53. The hydraulic pressure from the accumulator 56 is thus supplied only to the forward clutch C1. Therefore, the hydraulic pressure can be efficiently supplied from the accumulator 56 to the forward clutch C1 in a short time.

Moreover, the hydraulic pressure is not continually supplied from the accumulator 56 to the forward clutch C1 while the oil pump 51 is stopped. Therefore, it is not necessary to increase the capacity of the accumulator 56, and a large starter is not necessary. In other words, the accumulator 56 need only have a capacity large enough to supply the hydraulic pressure to the forward clutch C1 until the hydraulic pressure generated by the oil pump 51 is supplied to the forward clutch C1 after the oil pump 51 is started.

According to the vehicle drive system of the present invention, the hydraulic pressure can be efficiently supplied from the accumulator 56 to the forward clutch C1 in a short time upon restarting of the engine 10 while minimizing the capacity of the accumulator 56. Moreover, the manual valve 54 and the forward clutch C1 are directly connected to each other by the unbranched oil passage 65. Therefore, when the hydraulic pressure is supplied from the accumulator 56 to the forward clutch C1 upon restarting of the engine, the resistance applied to the oil flowing to the forward clutch C1 can be reduced as much as possible, and the oil passage length can be reduced. As a result, the hydraulic pressure can be very efficiently supplied from the accumulator 56 to the forward clutch C1 in a shorter time.

Moreover, the orifice 74 is provided in the oil passage 63, and the oil passage 64 is provided in parallel so as to bypass the orifice 74. The one-way valve 72 for allowing oil to flow only in the direction from the accumulator 56 toward the oil passage 62 is provided in the oil passage 64. Therefore, when the hydraulic pressure accumulated in the accumulator 56 is used upon restarting of the engine 10, the hydraulic pressure can be supplied quickly (at a high speed) from the accumulator 56 to the forward clutch C1 through the oil passage 64 having the one-way valve 72 provided therein.

On the other hand, while the oil pump 51 is being driven, the hydraulic pressure generated by the oil pump 51 is supplied to the accumulator 56 through the oil passage 63 having the orifice 74. The hydraulic pressure is thus accumulated slowly (at a low speed) in the accumulator 56. Accordingly, when driving of the oil pump 51 is started upon restarting of the engine 10, the hydraulic pressure generated by the oil pump 51 is not used so much for accumulation in the accumulator 56 in the state in which the hydraulic pressure accumulated in the accumulator 56 is reduced immediately after being supplied to the forward clutch C1. Therefore, when driving of the oil pump 51 is started, the hydraulic pressure generated by the oil pump 51 can be quickly (at a high speed) supplied to the forward clutch C1. Accordingly, a required capacity of the accumulator 56 can further be reduced.

The one-way valve 73 for allowing oil to flow only in the direction from the line pressure regulator valve 52 toward the secondary pulley 32 is provided upstream of the secondary sheave pressure control valve 58 in the oil passage 68. Therefore, when the oil pump 51 is stopped, oil leakage from the secondary pulley 32 to the line pressure regulator valve 52 can be prevented. As a result, reduction in hydraulic pressure in the secondary pulley 32 can be prevented.

Note that oil leakage from the primary pulley 31 to the line pressure regulator valve 52 may occur while the oil pump 51 is stopped. However, in the state where the engine 10 is stopped and the oil pump 51 is stopped, almost no hydraulic pressure is required to be applied to the primary pulley 31 and the hydraulic pressure need to be applied only to the secondary pulley 32. Therefore, oil leakage from the primary pulley 31 hardly occurs. Even if oil leakage from the primary pulley 31 occurs, such oil leakage does not cause slippage of the V belt when driving of the oil pump 51 is started.

As described above, the one-way valve 73 suppresses the release of the hydraulic pressure from the secondary pulley 32 while the oil pump 51 is stopped. Since an appropriate hydraulic pressure is applied to the secondary pulley 32 upon restarting of the engine 10, slippage of the V belt in the continuously variable transmission 30 can be reliably prevented.

When the manual valve 54 is in a non-running position, that is, the P range or the N range, one or both of the forward clutch C1 and the reverse brake B1 are connected to the drain EX. Therefore, even though the one-way valve 71 for allowing oil to flow only in the direction from the oil pump 51 toward the manual valve 54 is provided in the oil passage 62 connecting the oil pump 51 and the manual valve 54, the hydraulic pressure can be reliably released from one or both of the forward clutch C1 and the reverse clutch B1 when the hydraulic pressure is not required. Since the state in which the hydraulic pressure is applied to the forward clutch C1 and the reverse brake B1 is not maintained more than necessary, reliability and durability of the forward clutch C1 and the reverse brake B1 are not degraded.

As has been described above in detail, according to the vehicle driving system of the first embodiment, the accumulator 56 is connected to the oil passage 62, which connects the clutch pressure control valve 53 and the manual valve 54, by the oil passages 63, 64 through the electromagnetic switch valve 55. Moreover, the one-way valve 71 for allowing oil to flow only in the direction from the clutch pressure control valve 53 toward the manual valve 54 is provided between the connection point between the oil passages 63, 62 and the clutch pressure control valve 53. When the oil pump 51 is driven, the control unit 40 turns ON the electromagnetic switch valve 55 to switch the oil passage 63 to a communicating state. When the oil pump 51 is stopped, the control unit 40 turns OFF the electromagnetic switch valve 55 to switch the oil passage 63 to a shut-off state.

The hydraulic pressure generated by the oil pump 51 is thus accumulated in the accumulator 56 while the oil pump 51 is being driven. When the engine 10 is stopped and the oil pump 51 is stopped, the electromagnetic switch valve 55 is switched to a shut-off state, and the hydraulic pressure accumulated in the accumulator 56 is retained. When the engine 10 is restarted in this state and the oil pump 51 is driven again, the hydraulic pressure accumulated in the accumulator 56 is supplied to the forward clutch C1. At this time, the one-way valve 71 reliably prevents the hydraulic pressure from the accumulator 56 from leaking from the clutch pressure control valve 53. Moreover, the hydraulic pressure is not constantly supplied from the accumulator 56 to the forward clutch C1 while the oil pump 51 is stopped. Therefore, the capacity of the accumulator 56 can be reduced. According to the vehicle drive system of the first embodiment, the hydraulic pressure can be efficiently supplied from the accumulator 56 to the forward clutch C1 in a short time while minimizing the capacity of the accumulator 56.

Second Non-Limiting Embodiment

Figure 5:
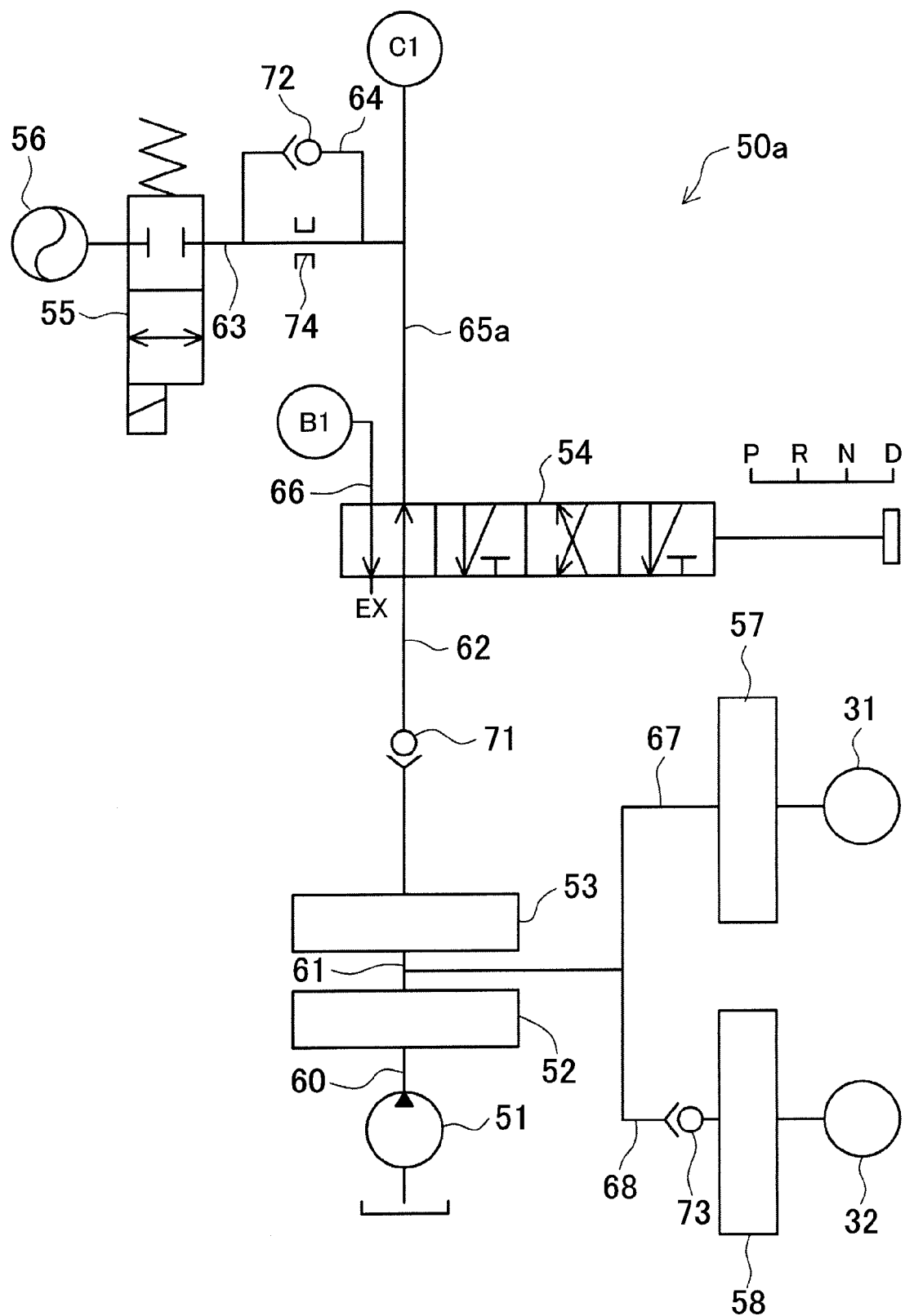
FIG. 5 is a diagram showing a hydraulic circuit in a vehicle drive system according to a second non-limiting embodiment.

Hereinafter, a second non-limiting embodiment will be described. The second embodiment has substantially the same basic structure as that of the first embodiment, but is different from the first embodiment in the structure of the hydraulic circuit included in the continuously variable transmission. In the following description, the same structural elements as those of the first embodiment are denoted by the same reference numerals and characters, and description thereof will be omitted as appropriate. The hydraulic circuit of the vehicle drive system of the second embodiment will be described mainly regarding the differences in structure from the first embodiment with reference to FIG. 5. FIG. 5 is a diagram showing a hydraulic circuit in the vehicle drive system of the second embodiment.

As shown in FIG. 5, in a hydraulic circuit 50a, the oil passage 63 to which the accumulator 56 is connected is connected to an oil passage 65a that connects the manual valve 54 and the forward clutch C1. In other words, the oil passage 63 is located closer to the forward clutch C1 than in the first embodiment. The oil passage length from the accumulator 56 to the forward clutch C1 is thus reduced.

In this hydraulic circuit 50a as well, the hydraulic pressure generated by the oil pump 51 is accumulated in the accumulator 56 while the oil pump 51 is being driven, as described in the first embodiment. When the engine 10 is stopped and the oil pump 51 is stopped, the electromagnetic switch valve 55 is turned OFF and the oil passage 63 is brought into a shut-off state. Therefore, the hydraulic pressure accumulated in the accumulator 56 is retained. When the engine 10 is restarted in this state and the oil pump 51 is driven again, the electromagnetic switch valve 55 is turned ON and the oil passage 63 is brought into a communicating state. The accumulator 56 and the oil passage 65a thus communicate with each other. As a result, the hydraulic pressure accumulated in the accumulator 56 is supplied through the oil passages 63, 64 to the oil passage 65a. Note that, since the orifice 74 is provided in the oil passage 63, the hydraulic pressure from the accumulator 56 is supplied through the oil passage 64 (bypassing the orifice 74) to the oil passage 65a and supplied to the forward clutch C1.

The hydraulic pressure supplied to the oil passage 65a is also supplied to the oil passage 62 through the manual valve 54. However, since the one-way valve 71 is provided in the oil passage 62, the hydraulic pressure supplied to the oil passage 62 is not discharged through the clutch pressure control valve 53. The hydraulic pressure from the accumulator 56 is thus supplied only to the forward clutch C1. Since the oil passage length from the accumulator 56 to the forward clutch C1 is reduced, the hydraulic pressure can be efficiently supplied from the accumulator 56 to the forward clutch C1, and the supply time can further be reduced. The other effects described in the first embodiment can also be obtained in the vehicle drive system of the second embodiment.

According to the vehicle drive system of the second embodiment, the hydraulic pressure can be efficiently supplied from the accumulator 56 to the forward clutch C1 in a shorter time while minimizing the capacity of the accumulator 56.

Third Non-Limiting Embodiment

Figure 6:
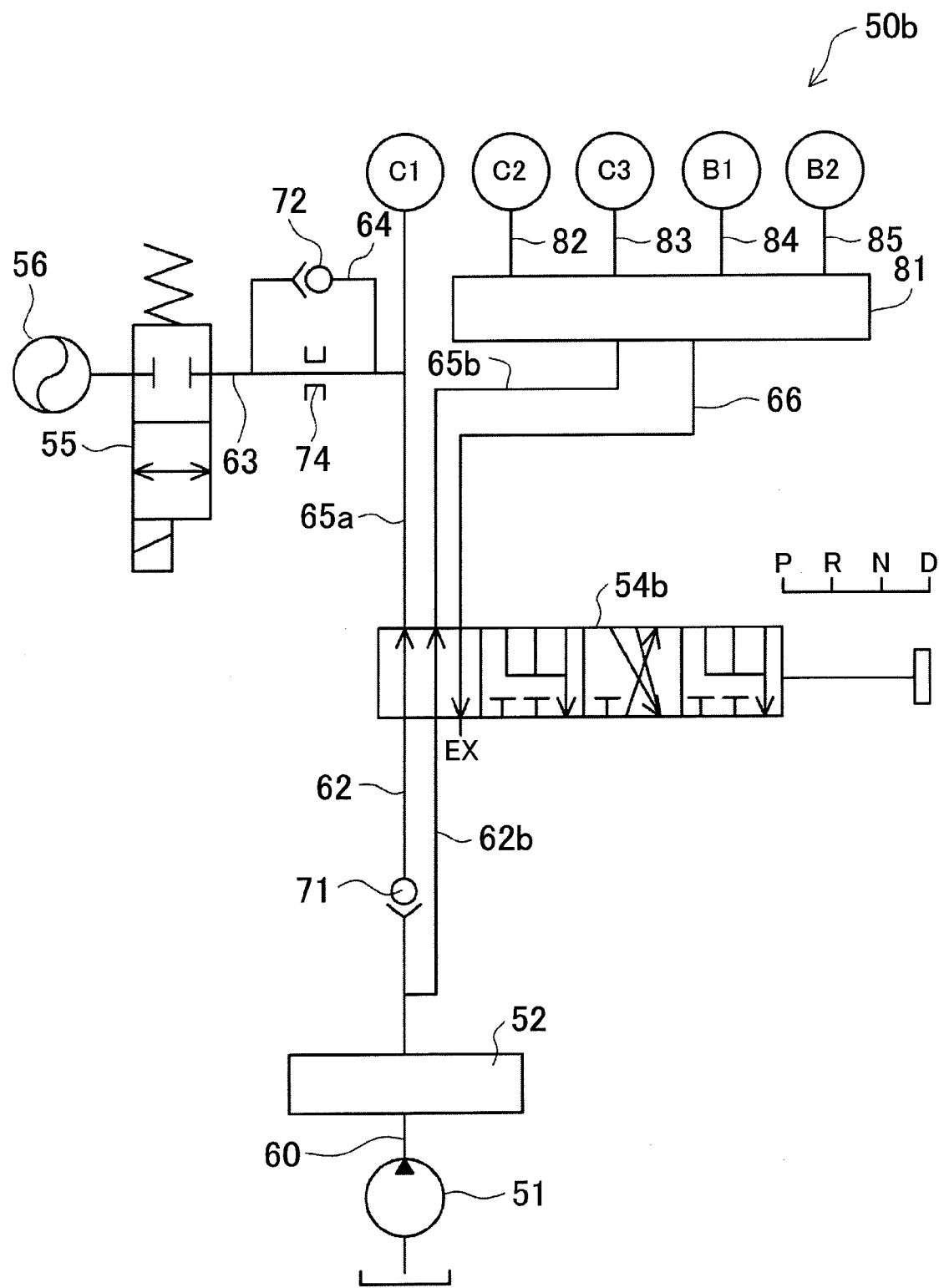
FIG. 6 is a diagram showing a hydraulic circuit in a vehicle drive system (a stepped automatic transmission) according to a third non-limiting embodiment.

Finally, a third non-limiting embodiment will be described. Unlike the first and second embodiments, the present invention is applied to a stepped automatic transmission (stepped AT) in the third embodiment. The basic structure of the third embodiment is substantially the same as that of the second embodiment. However, the continuously variable transmission 30 is replaced with a stepped automatic transmission 80 (see FIG. 1), and the structure of a hydraulic circuit provided in the stepped automatic transmission 80 is different from that of the second embodiment. In the following description, the same structural elements as those of the second embodiment are denoted by the same reference numerals and characters, and description thereof will be omitted as appropriate. The hydraulic circuit in the vehicle drive system of the third embodiment will be described mainly regarding the differences in structure from the second embodiment with reference to FIG. 6. FIG. 6 is a diagram showing a hydraulic circuit in the vehicle drive system (stepped AT) of the third embodiment. Note that it is herein assumed that the forward clutch C1 is engaged in all the forward speeds of the D range.

As shown in FIG. 6, in a hydraulic circuit 50b, a clutch pressure control valve is not provided, and the line pressure regulator valve 52 and a manual valve 54b are connected by the oil passage 62. The oil passage 62 has a branched oil passage 62b. The branched oil passage 62b is also connected to the manual valve 54b.

The manual valve 54b is connected to the forward clutch C1 by the oil passage 65a, and is connected to a shift valve/control valve unit 81 by oil passages 65b, 66. The shift valve/control valve unit 81 controls engagement and disengagement of clutches C2, C3 and brakes B1, B2 included in the stepped automatic transmission 80. The clutch C2 and the shift valve/control valve unit 81 are connected by an oil passage 82, the clutch C3 and the shift valve/control valve unit 81 are connected by an oil passage 83, the brake B1 and the shift valve/control valve unit 81 are connected by an oil passage 84, and the brake B2 and the shift valve/control valve unit 81 are connected by an oil passage 85. Accordingly, when the manual valve 54b is set in the D range, a pattern of engagement/disengagement combination of the clutches C2, C3 and the brakes B1, B2 is changed by hydraulic control of the shift valve/control valve unit 81 according to the running state of the vehicle, whereby a predetermined gear stage of the stepped automatic transmission 80 is selected.

In this hydraulic circuit 50b as well, as described in the second embodiment, the hydraulic pressure generated by the oil pump 51 is accumulated in the accumulator 56 while the oil pump 51 is being driven. When the engine 10 is stopped and the oil pump 51 is stopped, the electromagnetic switch valve 55 is turned OFF and the oil passage 63 is brought into a shut-off state. The hydraulic pressure accumulated in the accumulator 56 is thus retained. When the engine 10 is restarted in this state and the oil pump 51 is driven again, the electromagnetic switch valve 55 is turned ON and the oil passage 63 is brought into a communicating state. The accumulator 56 and the oil passage 65a thus communicate with each other. As a result, the hydraulic pressure accumulated in the accumulator 56 is supplied through the oil passages 63, 64 to the oil passage 65a. Note that, since the orifice 74 is provided in the oil passage 63, the hydraulic pressure from the accumulator 56 is supplied through the oil passage 64 (bypassing the orifice 74) to the oil passage 65a and supplied to the forward clutch C1.

The hydraulic pressure supplied to the oil passage 65a is also supplied to the oil passage 62 through the manual valve 54b. However, since the one-way valve 71 is provided in the oil passage 62, the hydraulic pressure supplied to the oil passage 62 is not released from the line pressure regulator valve 52. The hydraulic pressure from the accumulator 56 is thus supplied only to the forward clutch C1. Since the oil passage length from the accumulator 56 to the forward clutch C1 is short, the hydraulic pressure can be efficiently supplied from the accumulator 56 to the forward clutch C1, and the supply time can be reduced. The other effects obtained by the first and second embodiments described above can also be obtained in the vehicle drive system of the third embodiment except the effect of preventing slippage of the V belt in the continuously variable transmission.

According to the vehicle drive system of the third embodiment, even when the vehicle drive system includes the stepped automatic transmission 80, the hydraulic pressure can be efficiently supplied from the accumulator 56 to the forward clutch C1 in a short time while minimizing the capacity of the accumulator 56.

Note that the embodiments described above are shown by way of example only and do not limit the present invention. It should be understood that various improvements and modifications can be made without departing from the scope and spirit of the invention. For example, in the third embodiment, the oil passage 63 is disposed to be connected to the oil passage 65a. However, the oil passage 63 may be disposed to be connected to the oil passage 62 (between the manual valve 54b and the one-way valve 71) as in the first embodiment.

The mechanical oil pump 51 connected to the engine 10 is shown in the above embodiments. However, the present invention is also applicable to a vehicle drive system including an electric oil pump that is not connected to the engine.

What is claimed is:

1. A vehicle drive unit, comprising:
   a hydraulic circuit that includes:
   an oil pump for generating a hydraulic pressure,
   a hydraulic servo that is controlled by the hydraulic pressure,
   a hydraulic control valve for controlling the hydraulic pressure generated by the oil pump to a predetermined pressure to operate the hydraulic servo,
   a manual valve for switching an oil passage according to a shift position operation of a driver,
   an accumulator for accumulating the hydraulic pressure generated by the oil pump, and
   a switch valve for switching a first oil passage, that connects the accumulator and the hydraulic servo, between a shut-off state and a communicating state, wherein
   the oil pump is stopped and driven as required in a state where the manual valve is set to a running position, and the hydraulic circuit supplies the hydraulic pressure accumulated in the accumulator to the hydraulic servo when driving of the oil pump is started,
   the accumulator is connected through the switch valve to a second oil passage connecting the hydraulic control valve and the hydraulic servo,
   a first one-way valve for allowing oil to flow only in a direction from the hydraulic control valve toward the accumulator and the hydraulic servo is provided in the second oil passage connecting the hydraulic control valve and the hydraulic servo, and
   the switch valve is switched to a communicating state when the oil pump is driven, and to a shut-off state when the oil pump is stopped.

2. The vehicle drive unit according to claim 1, wherein the manual valve is provided in the second oil passage connecting the first one-way valve and the hydraulic servo.

3. The vehicle drive unit according to claim 2, wherein the manual valve drains the hydraulic pressure that is applied from the manual valve to the hydraulic servo, when the manual valve is set to a shift position in which the hydraulic pressure is not required for the hydraulic servo.

4. The vehicle drive unit according to claim 3, wherein the manual valve and the hydraulic servo are directly connected by an unbranched third oil passage.

5. The vehicle drive unit according to claim 3, wherein the accumulator is connected through the switch valve to a fourth oil passage connecting the manual valve and the hydraulic servo.

6. The vehicle drive unit according to claim 5, wherein the first oil passage in which a throttle valve is provided and a fifth oil passage in which a second one-way valve for allowing oil to flow only in a direction from the accumulator toward the hydraulic servo are provided in parallel and connect to the second oil passage connecting the hydraulic control valve and the hydraulic servo and the accumulator.

7. The vehicle drive unit according to claim 5, wherein
   the vehicle drive unit is a continuously variable transmission including a primary pulley and a secondary pulley,
   the hydraulic servo is one of a forward friction engagement element and a reverse friction engagement element,
   the hydraulic control valve is a clutch pressure control valve, and
   a third one-way valve for allowing oil to flow only in a direction from the line pressure regulator valve toward the pulley is provided in a sixth oil passage that connects to a seventh oil passage, the seventh oil passage connecting the clutch pressure control valve and a line pressure regulator valve for regulating the hydraulic pressure generated by the oil pump to a line pressure to be supplied to the pulley, and the pulley.

8. The vehicle drive unit according to claim 4, wherein the first oil passage in which a throttle valve is provided and a fifth oil passage in which a second one-way valve for allowing oil to flow only in a direction from the accumulator toward the hydraulic servo are provided in parallel and connect to the second oil passage connecting the hydraulic control valve and the hydraulic servo and the accumulator.

9. The vehicle drive unit according to claim 4, wherein
   the vehicle drive unit is a continuously variable transmission including a primary pulley and a secondary pulley,
   the hydraulic servo is one of a forward friction engagement element and a reverse friction engagement element,
   the hydraulic control valve is a clutch pressure control valve, and
   a third one-way valve for allowing oil to flow only in a direction from the line pressure regulator valve toward the pulley is provided in a sixth oil passage that connects to a seventh oil passage, the seventh oil passage connecting the clutch pressure control valve and a line pressure regulator valve for regulating the hydraulic pressure generated by the oil pump to a line pressure to be supplied to the pulley, and the pulley.

10. The vehicle drive unit according to claim 3, wherein the first oil passage in which a throttle valve is provided and a fifth oil passage in which a second one-way valve for allowing oil to flow only in a direction from the accumulator toward the hydraulic servo are provided in parallel and connect to the second oil passage connecting the hydraulic control valve and the hydraulic servo and the accumulator.

11. The vehicle drive unit according to claim 3, wherein
    the vehicle drive unit is a continuously variable transmission including a primary pulley and a secondary pulley,
    the hydraulic servo is one of a forward friction engagement element and a reverse friction engagement element,
    the hydraulic control valve is a clutch pressure control valve, and
    a third one-way valve for allowing oil to flow only in a direction from the line pressure regulator valve toward the pulley is provided in a sixth oil passage that connects to a seventh oil passage, the seventh oil passage connecting the clutch pressure control valve and a line pressure regulator valve for regulating the hydraulic pressure generated by the oil pump to a line pressure to be supplied to the pulley, and the pulley.

12. The vehicle drive unit according to claim 2, wherein the manual valve and the hydraulic servo are directly connected by an unbranched third oil passage.

13. The vehicle drive unit according to claim 12, wherein the first oil passage in which a throttle valve is provided and a fifth oil passage in which a second one-way valve for allowing oil to flow only in a direction from the accumulator toward the hydraulic servo are provided in parallel and connect to the second oil passage connecting the hydraulic control valve and the hydraulic servo and the accumulator.

14. The vehicle drive unit according to claim 12, wherein
the vehicle drive unit is a continuously variable transmission including a primary pulley and a secondary pulley,
the hydraulic servo is one of a forward friction engagement element and a reverse friction engagement element,
the hydraulic control valve is a clutch pressure control valve, and
a third one-way valve for allowing oil to flow only in a direction from the line pressure regulator valve toward the pulley is provided in a sixth oil passage that connects to a seventh oil passage, the seventh oil passage connecting the clutch pressure control valve and a line pressure regulator valve for regulating the hydraulic pressure generated by the oil pump to a line pressure to be supplied to the pulley, and the pulley.

15. The vehicle drive unit according to claim 2, wherein the accumulator is connected through the switch valve to a fourth oil passage connecting the manual valve and the hydraulic servo.

16. The vehicle drive unit according to claim 15, wherein the first oil passage in which a throttle valve is provided and a fifth oil passage in which a second one-way valve for allowing oil to flow only in a direction from the accumulator toward the hydraulic servo are provided in parallel and connect to the second oil passage connecting the hydraulic control valve and the hydraulic servo and the accumulator.

17. The vehicle drive unit according to claim 15, wherein
the vehicle drive unit is a continuously variable transmission including a primary pulley and a secondary pulley,
the hydraulic servo is one of a forward friction engagement element and a reverse friction engagement element,
the hydraulic control valve is a clutch pressure control valve, and
a third one-way valve for allowing oil to flow only in a direction from the line pressure regulator valve toward the pulley is provided in a sixth oil passage that connects to a seventh oil passage, the seventh oil passage connecting the clutch pressure control valve and a line pressure regulator valve for regulating the hydraulic pressure generated by the oil pump to a line pressure to be supplied to the pulley, and the pulley.

18. The vehicle drive unit according to claim 2, wherein the first oil passage in which a throttle valve is provided and a fifth oil passage in which a second one-way valve for allowing oil to flow only in a direction from the accumulator toward the hydraulic servo are provided in parallel and connect to the second oil passage connecting the hydraulic control valve and the hydraulic servo and the accumulator.

19. The vehicle drive unit according to claim 18, wherein
the vehicle drive unit is a continuously variable transmission including a primary pulley and a secondary pulley,
the hydraulic servo is one of a forward friction engagement element and a reverse friction engagement element,
the hydraulic control valve is a clutch pressure control valve, and
a third one-way valve for allowing oil to flow only in a direction from the line pressure regulator valve toward the pulley is provided in a sixth oil passage that connects to a seventh oil passage, the seventh oil passage connecting the clutch pressure control valve and a line pressure regulator valve for regulating the hydraulic pressure generated by the oil pump to a line pressure to be supplied to the pulley, and the pulley.

20. The vehicle drive unit according to claim 1, wherein the first oil passage in which a throttle valve is provided and a fifth oil passage in which a second one-way valve for allowing oil to flow only in a direction from the accumulator toward the hydraulic servo are provided in parallel and connect to the second oil passage connecting the hydraulic control valve and the hydraulic servo and the accumulator.

21. The vehicle drive unit according to claim 20, wherein
the vehicle drive unit is a continuously variable transmission including a primary pulley and a secondary pulley,
the hydraulic servo is one of a forward friction engagement element and a reverse friction engagement element,
the hydraulic control valve is a clutch pressure control valve, and
a third one-way valve for allowing oil to flow only in a direction from the line pressure regulator valve toward the pulley is provided in a sixth oil passage that connects to a seventh oil passage, the seventh oil passage connecting the clutch pressure control valve and a line pressure regulator valve for regulating the hydraulic pressure generated by the oil pump to a line pressure to be supplied to the pulley, and the pulley.

22. The vehicle drive unit according to claim 1, wherein
the vehicle drive unit is a continuously variable transmission including a primary pulley and a secondary pulley,
the hydraulic servo is one of a forward friction engagement element and a reverse friction engagement element,
the hydraulic control valve is a clutch pressure control valve, and
a third one-way valve for allowing oil to flow only in a direction from the line pressure regulator valve toward the pulley is provided in a sixth oil passage that connects to a seventh oil passage, the seventh oil passage connecting the clutch pressure control valve and a line pressure regulator valve for regulating the hydraulic pressure generated by the oil pump to a line pressure to be supplied to the pulley, and the pulley.

* * * * *